United States Patent
Nagel et al.

(10) Patent No.: US 12,030,506 B2
(45) Date of Patent: Jul. 9, 2024

(54) WORK MACHINE STABILITY MONITORING SYSTEM

(71) Applicant: Caterpillar Paving Products Inc., Brooklyn Park, MN (US)

(72) Inventors: Brian D. Nagel, Ramsey, MN (US); Clinton A. Metzger, Congerville, IL (US); Bryce D. Uitermarkt, Princeton, MN (US); Tyler S. Burger, Plymouth, MN (US); Rianto A. Rahman, Plymouth, MN (US); Timothy J. Lindholm, Blaine, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 17/713,585

(22) Filed: Apr. 5, 2022

(65) Prior Publication Data

US 2023/0311903 A1    Oct. 5, 2023

(51) Int. Cl.
*E01C 19/28*    (2006.01)
*B60W 30/04*    (2006.01)
(Continued)

(52) U.S. Cl.
CPC ............ *B60W 40/10* (2013.01); *B60W 30/04* (2013.01); *B62D 6/001* (2013.01); *E01C 19/28* (2013.01); *B60W 2300/17* (2013.01); *B60W 2510/20* (2013.01); *B60W 2520/18* (2013.01); *B60W 2710/20* (2013.01); *B60W 2720/00* (2013.01)

(58) Field of Classification Search
CPC .. B60W 40/10; B60W 30/04; B60W 2300/17; B60W 2510/20; B60W 2520/18; B60W 2710/20; B60W 2720/00; B62D 6/001; E01C 19/28
See application file for complete search history.

(56) References Cited

U.S. PATENT DOCUMENTS

| | | |
|---|---|---|
| 7,260,460 B2 | 8/2007 | Mattes et al. |
| 8,019,514 B2 | 9/2011 | Yuet et al. |
| (Continued) | | |

FOREIGN PATENT DOCUMENTS

| | | |
|---|---|---|
| CN | 101830225 B | 9/2012 |
| CN | 111713265 A | 9/2020 |
| (Continued) | | |

OTHER PUBLICATIONS

Liu, Bo, et al., "Field Tests of a Tractor Rollover Detection and Emergency Notification System", J Agric Saf Health Apr. 21, 2015(2) 113-127 doi10.13031 jash.21.10812.

*Primary Examiner* — Jaime Figueroa
*Assistant Examiner* — Zachary Joseph Wallace

(57) ABSTRACT

A work machine stability monitoring system may include an environmental sensor configured to capture environmental information about the ground around a work machine, a machine operating sensor configured to capture operation information of the work machine, and a stability analyzer. The stability analyzer may be configured receiving the environmental information and the operation information, prospectively identifying zones with stability issues based on the environmental information, and identifying active stability conditions of the work machine based on the operation information.

18 Claims, 4 Drawing Sheets

(51) Int. Cl.
*B60W 40/10*     (2012.01)
*B62D 6/00*      (2006.01)

(56) References Cited

U.S. PATENT DOCUMENTS

| | | |
|---|---|---|
| 8,620,528 B2 | 12/2013 | Lemmen et al. |
| 9,114,705 B2 | 8/2015 | Goraya et al. |
| 9,187,051 B2 | 11/2015 | Feser et al. |
| 9,527,467 B2 | 12/2016 | Baba et al. |
| 9,797,247 B1 * | 10/2017 | Nelson .................... G05D 1/024 |
| 9,945,081 B1 * | 4/2018 | Beckhusen ............. E01C 19/38 |
| 11,135,881 B2 | 10/2021 | Hall et al. |
| 2014/0172224 A1 * | 6/2014 | Matthews ............... A01D 75/28 |
| | | 701/25 |
| 2020/0172087 A1 | 6/2020 | Shur et al. |
| 2021/0061283 A1 * | 3/2021 | Hudson .................... B62D 7/14 |
| 2021/0094535 A1 * | 4/2021 | Thompson ............ B60W 40/06 |

FOREIGN PATENT DOCUMENTS

| | | | | |
|---|---|---|---|---|
| EP | 2182117 A1 * | 5/2010 | ........... | E01C 19/288 |
| GB | 2574305 A | 12/2019 | | |
| IN | 201711000409 A | 7/2018 | | |
| KR | 100261429 B1 | 7/2000 | | |

* cited by examiner

WORK MACHINE STABILITY MONITORING SYSTEM

TECHNICAL FIELD

The present application generally relates to work machines. More particularly, the present disclosure relates to work machines having a stability monitoring system. Still more particularly, the present application relates to autonomous compaction machines having stability monitoring systems to reduce or prevent rollover and/or sliding.

BACKGROUND

Work machines may encounter a wide variety of conditions that may have an effect on the stability of a machine. Some of these conditions may be visually perceptible while some may be hidden or less perceptible. For example, the slope of the ground may be visually perceptible, while the soil conditions below the surface may not be visually perceptible. Moreover, particular operating parameters and/or operating conditions of the machine may also affect the stability of a machine. For example, compaction equipment may include vibratory compactors that may help with compaction processes, but may also reduce the traction of the machine and/or affect the stability of the supporting ground.

U.S. Pat. No. 9,114,705 relates to a system and method of preventing articulated machine roll-over. The machine includes a controller to compare a position of a first frame with a position of a second frame to determine the relative positions of the frames and selectively locks an inter axle differential when the relative positions exceed a limit.

SUMMARY

In one or more examples, a work machine stability monitoring system may include an environmental sensor configured to capture environmental information about the ground around a work machine, a machine operating sensor configured to capture operation information of the work machine, and a stability analyzer. The stability analyzer may be configured for receiving the environmental information and the operation information, prospectively identifying zones with stability issues based on the environmental information, and identifying active stability conditions of the work machine based on the operation information.

In one or more examples, a method of monitoring the stability of a work machine may include receiving environmental data about the ground surrounding a work machine, receiving work machine operating data about the work machine, prospectively identifying a zone around the machine that has a stability issue, and identifying active stability conditions.

DETAILED DESCRIPTION

The present application, in one or more examples, relates to a work machine stability control system that gathers a wide variety of relevant inputs including, for example, environmental inputs and machine operation inputs and assesses the current and/or prospective stability of the work machine based on the one or more inputs. In response to the stability assessment, the system may issue an alert, provide a machine control, communicate with a backend system or control station, or otherwise take measures to remedy or avoid stability issues for the current machine, or other machines, based on the input. The wide range of potential inputs that may be based on the type of work machine being operated, the wide variety of potential environmental and operating conditions, and the wide variety of available remedies that may also be based on the type of work machine being operated establishes a complicated problem that human operators are unable to solve, much less an autonomous machine.

Figure 1:
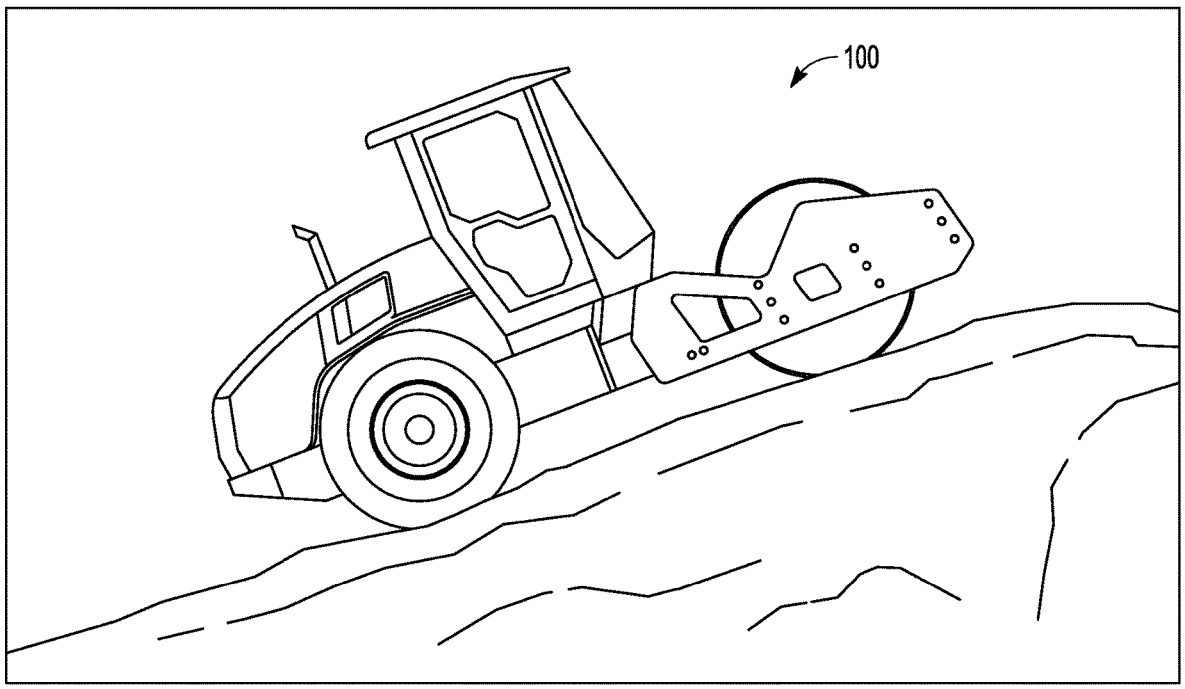
FIG. 1 depicts a work machine climbing a grade, according to one or more examples.

FIG. 1 perspective view of a work machine 100, according to one or more embodiments. As shown, the work machine 100 may be operated over uneven ground and may encounter loose soils, slopes, and other environmental conditions that may give rise to stability issues for the work machine. While a relatively dramatic slope has been shown, much shallower slopes may give rise to stability issues depending on other environmental and/or machine operating conditions such as loose soils and operation of vibration systems, respectively.

Figure 2:
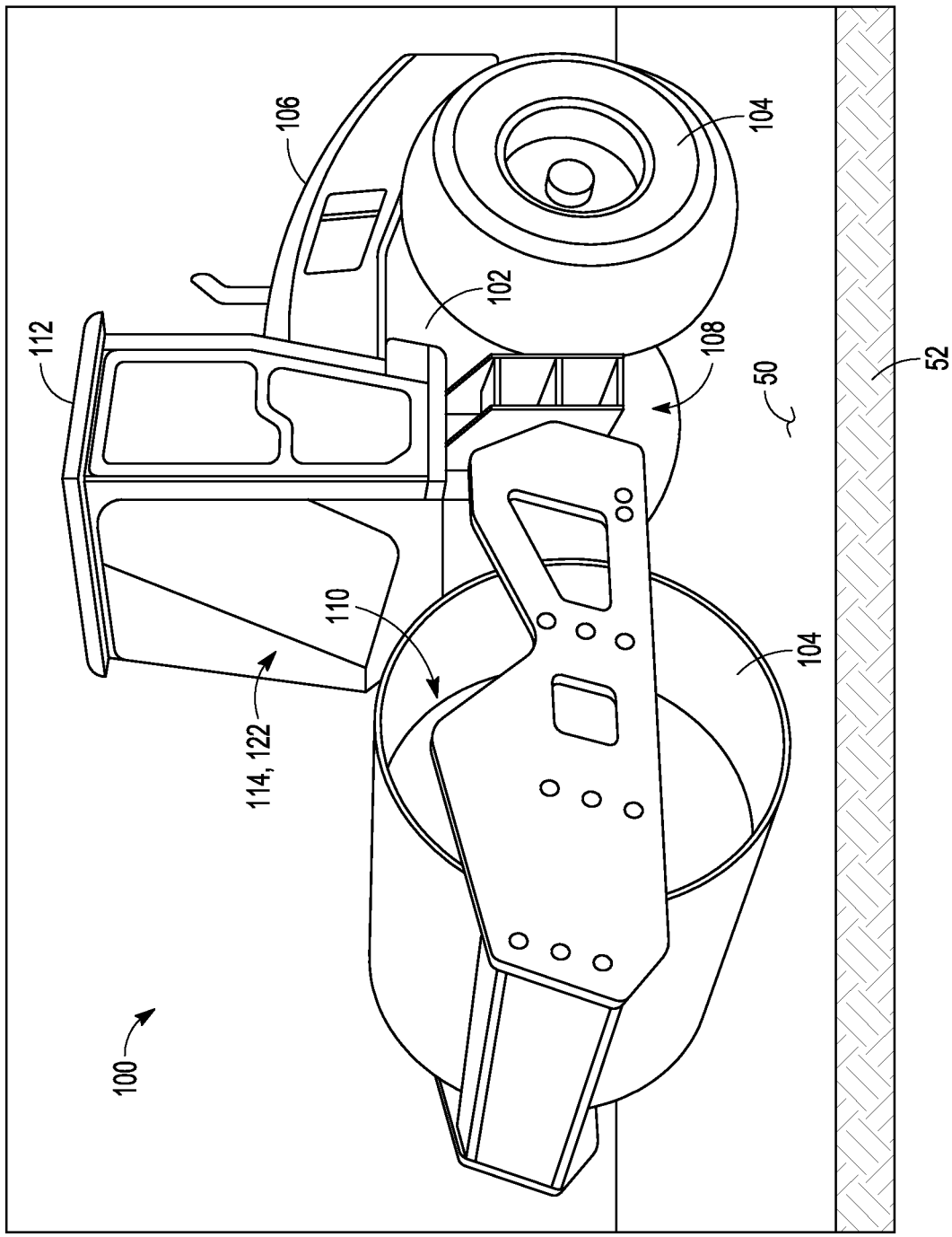
FIG. 2 is a schematic diagram of a work machine, according to one or more embodiments.

FIG. 2 is a diagrammatic view of a work machine 100, according to one or more examples. The work machine 100 may include a cold planer, a paving machine, a grader, a haul truck, an articulating haul truck, a compactor, an articulating compactor, a tractor, a loader, an excavator, or another work machine. In the case of compactors, these machines may be employed for compacting asphalt, dirt, gravel, or other soil, ground up material such as tires, and other compactable work materials associated with construction sites such as road surfaces. The compaction machine may be selected from a wide variety of options depending on the nature of the site and the desired compaction. For example, smooth wheel rollers, sheep's foot, elephant foot, pad foot, or slash presser rollers may be used. In still other situations, pneumatic tire rollers, wobble wheel rollers, impact rollers, or grid rollers may be used. Still other types of compaction machines may be provided and still other machines may be provided.

In the illustrated example, the work machine 100 is a compaction machine that can travel over a surface 50 compacting a work material 52 such as, for example, a soil subgrade. The work machine 100 may include a body or frame 102 that inter-operatively connects the various physical, structural, and/or operable features that enable the compaction machine 100 to function. In the present example, the frame may be an articulating frame forming a hinge between a front portion thereof and a rear portion thereof and the hinged nature of the frame may be used to steer the machine. The work machine may also include one or more traction or ground engaging systems 104 such as tracks, wheels, and/or rollers. In the present example, the work machine 100 may include a set of wheels with tires on the rear end of the machine and a compaction roller on the front of the machine. The traction system may be operable by a motive power source 106 arranged on the frame. The motive power source may include, for example, an internal combustion engine or an electric motor that can generate power to physically drive the traction system 104 and move the compaction machine 100. Additional auxiliary systems may draw power from the motive power source as well. For example, the machine may include a steering system 108 including a steering linkage driven by a power source that derives power from the motive power source 106 or other power source and is adapted to direct the traction system 104 or articulate the frame 102 to, in turn, direct the work machine 100 in a particular direction. A vibration system 110 may also be provided, which may be separate from or integrated into the traction system 104 to vibrate the machine 100 and/or rollers thereof to assist with compaction of the supporting surface and/or work material below the supporting surface. For example, the vibration system 110 on the work machine 100 shown may be incorporated into the roller on the front of the machine but might not be incorporated into the wheels on the rear of the machine. Depending on the level of autonomy provided by the machine controller(s) discussed below, the work machine may also include a cab 112 for an operator and one or more operation feature such as gas/brake pedals, steering wheel, or other operator control features as well as operator feedback and interface features such as displays and/or speakers for showing/sounding operating parameters, alerts, and the like.

It will be appreciated that while a single roller machine has been shown, a front and rear roller may be provided and other machines other than compactors may also be provided. These other machines may have different implements that may affect the stability analysis of the work machine 100. For example, a compactor may have a work implement in the form of a roller and/or vibratory roller. Other work machines may have haul beds, material buckets, rotary tools, paving screeds, or other moveable or otherwise changing implements that may come into play when calculating or otherwise considering the stability of the machine as discussed in more detail below.

As shown, the work machine 100 may also include an electronic control module (ECM) 114. The ECM 114 may be adapted to perform computing processes to operate the machine 100. In one or more examples, the control module 114 may process onboard commands from an equipment operator and may operate particular aspects of the machine 100 according to the operator's instruction. Additionally or alternatively, the control module 114 may process remote commands from a remote operator and/or may function to operate the work machine 100 autonomously by performing onboard autonomous control or by receiving autonomous commands from an offboard autonomous controller. The ECM 114 may include, or access, memory, secondary storage devices, processors, and any other components for running an application. The memory and secondary storage devices may be in the form of read-only memory (ROM) and/or random-access memory (RAM) or integrated circuitry that is accessible by the module 114. Various other circuits may be associated with the ECM 114 such as power supply circuitry, signal conditioning circuitry, driver circuitry, and other types of circuitry.

The work machine 100 may also include a stability monitoring system 116. The system 116 may be configured to monitor current and/or prospective stability issues and take remedial, interruptive, and/or notifying actions accordingly. The stability monitoring system 116 may include one or more environmental sensors 118, that may provide information about the surroundings of the machine 100, and machine operation sensors or devices 120 that may provide machine operating information relevant to performing a stability analysis. The system 116 may also include a stability analyzer 122 for performing the analysis and generating an output 124 to trigger an alarm or other alert, control one or more aspects of the machine according to the stability analysis, and/or communicate the result or a control instruction to another location off of the present or local work machine.

Figure 3:
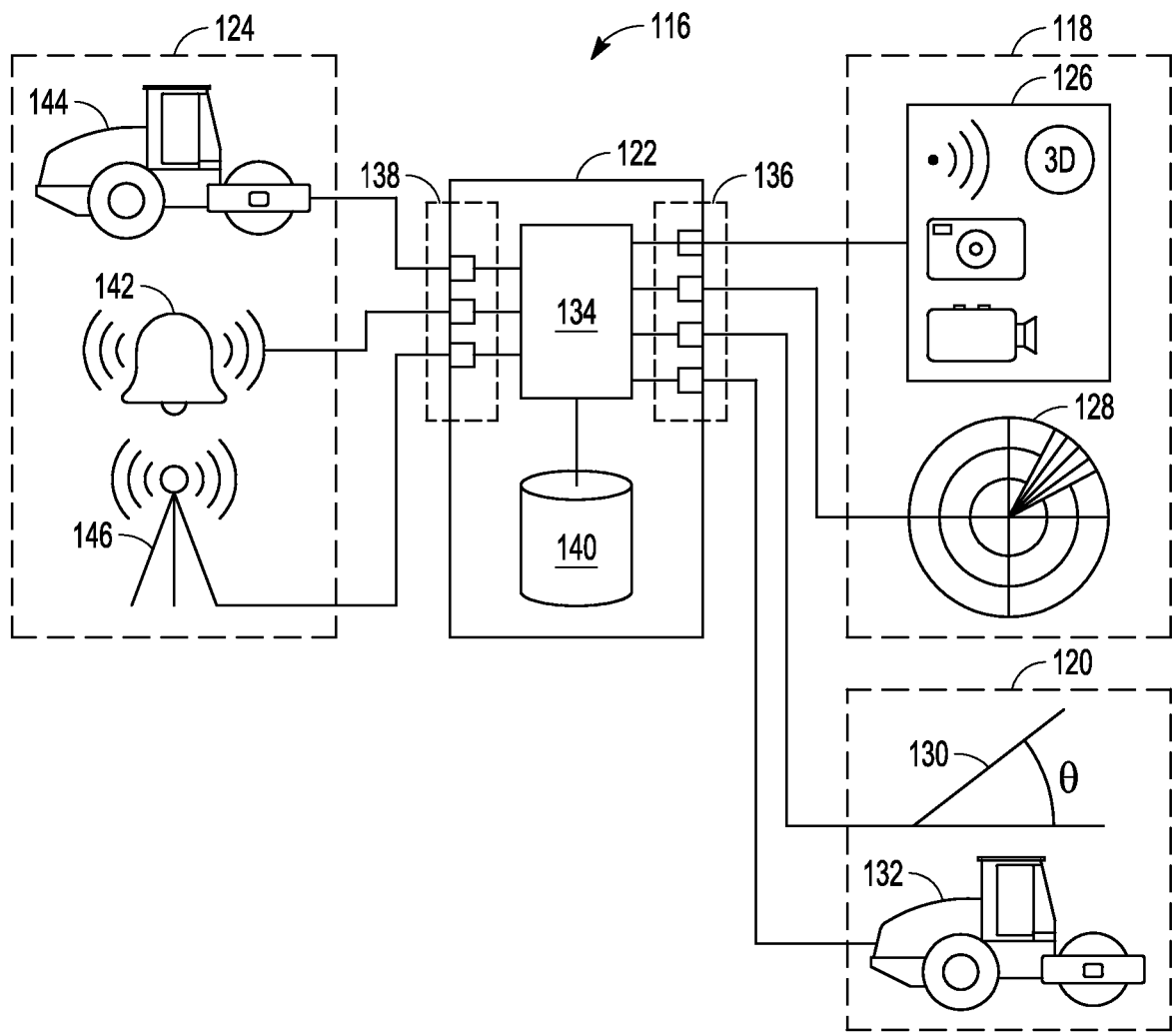
FIG. 3 is a schematic system diagram of a work machine stability control system, according to one or more examples.

As mentioned, stability analysis may involve several different factors and one or more sensors may be provided to capture information pertaining to one or more factors. For example, and as shown in FIG. 3, the one or more environmental sensors 118 may include a surface sensor 126, a soil condition sensor 128, and/or another sensor adapted to capture surrounding conditions of the work machine 100. Still other sensors adapted to sense conditions of the surrounding environment may be provided. As another example, and as also shown in FIG. 3, the one or more machine operation sensors 120 may include an orientation sensor 130 and/or feedback sensors or devices 132 from one or more systems of the machine, or other sensors. Feedback sensors or devices 132, for example, may provide feedback from systems such as the vibration system or other implement of the work machine, the traction system, the steering system, or other systems. The feedback sensors or devices 132 may provide data about the current operating conditions of the machine 100. Each of the above-described sensors, sensing systems, or devices, may be described in detail below.

Beginning with the environmental sensors 118, the surface sensor 126 may be configured to capture surrounding environmental information relating to obstacles and/or sloping grade information such as approaching grades and/or adjacent grades that may generally be visible features of the environment. The surface sensor or sensors 126 may include a camera, video camera, stereo camera, lidar scanner or other 3D scanner, for example. The surface sensor or sensors 126 may be arranged on a top, front, rear, and/or sides of a work machine 100 to provide image data and/or point cloud data, for example, so details about the surrounding and/or approaching grades or other surrounding features may be captured. The surface sensor 126 may capture surrounding and/or approaching information periodically or continuously and may deliver a surface data feed to the stability analyzer 122 for use in assessing the current stability or prospective stability of the work machine 100. The surface data feed may allow for the ongoing creation and updating of a slope map such as a topographical map, for example. The map may be created based on global positioning system (GPS) data of the machine 100 combined with the surface data as the machine moves across a work site. Other positioning systems may be used including more basic positioning systems that are based on starting points, travel directions and speeds, checkpoints, and/or landmarks, for example. The surface sensor or sensors 126 may be arranged on an oscillating base or turret to capture imagery or data outside the frame of view of the sensor 126. That is, the surface sensor 126 may oscillate, rotate, or otherwise move to increase the area about which image or other data may be captured by a single sensor.

The soil condition sensor 128 may be configured to capture approaching, surrounding, or underfoot soil condition information. In one or more examples, the soil condition sensor 128 may include a ground penetrating radar (GPR), for example, that may be able to capture various characteristics of the soil such as density, water content, void percentage and the like. The GPR may capture ground or soil data continuously or periodically and may deliver the data to the stability analyzer 122 for use in assessing the current stability or prospective stability of the work machine 100. The ground or soil data may allow for the ongoing creation and updating of a soil condition map, for example, using global positioning system (GPS) data of the machine combined with the ground or soil data as the machine moves across the work site. Other positioning systems may be used including more basic positioning systems based on starting points, travel directions and speeds, checkpoints, and/or landmarks, for example. The GPR may be arranged at a suitable vantage point on the work machine 100 and be adapted to scan the ground around, under, and/or in front of the work machine. One or more GPR's may be used and, like the surface sensor 126, may be arranged on an oscillating or rotating device to increase the area about which soil data may be captured by a single sensor.

Turning now to machine operation sensors 120, the orientation sensor 130 may be configured for establishing the orientation of the work machine 100 (e.g., pitch, roll, and/or yaw) relative to the direction of the force of gravity, for example. In one or more examples, the orientation sensor 130 may include a gyroscope and/or other sensor adapted to measure pitch, roll, and/or yaw such as one or more accelerometers or a series of accelerometers, for example. The orientation sensor 130 may capture orientation information continuously or periodically and may deliver the data to the stability analyzer 122 for use in assessing the current stability of the work machine 100. The orientation sensor 130 may be arranged within the machine 100 or on a surface of the machine 100, but may be encapsulated to protect the sensor, for example.

As mentioned, the feedback sensors or devices 132 may provide information about the operation of particular aspects of the machine 100. For example, in the case of the vibration system 110, the feedback device 132 may provide information about whether the vibration system 100 is operating and/or what frequency the vibration system 110 is operating at. Feedback devices 132 of the traction system 104 may, for example, provide speed information of the traction system or vehicle or relative speeds of the several wheels or rollers may be provided. Other traction system data may also be provided. Feedback devices 132 of the steering system 108 may include the degree and direction of turn that is performed by the work machine 100 such as by monitoring steering cylinder positions, rack and pinion positions, linkage positions, or other positions of other aspects of the steering system 108. Still other feedback devices 132 may include a hitch rotation sensor that may provide the relative rotational positions of a front and rear of the work machine about an articulation hitch, for example and, thus, allow for determining a degree of turn. Still other feedback devices 132 may be for articulating arms, buckets, rotary cutters, screeds and the like. That is, whether these implements are operating and the position of these implements relative to the work machine may affect the stability analysis and feedback sensors/devices 132 may provide that information to the stability analyzer 122. In some cases, where, for example, the implement loading on the work machine changes (e.g., when a truck bed or loader bucket is full, partially full, or empty), the amount of load carried by the implement may be provided by the feedback sensor or device in addition to its position, for example. In still other examples, feedback sensors/devices 132 may relate to an offset between a between a front portion of a work machine and a back portion. For example, an asphalt paver may have an offset hitch allowing for the front and rear drums to be offset laterally relative to one another rather than having one follow directly behind the other. One or more feedback sensors/devices 132 may be provided to provide an offset distance or amount.

With continued reference to FIG. 3, the stability analyzer 122 is shown. The stability analyzer 122 may be configured to receive the environmental and operating data from the one or more environmental sensors 118 and/or machine operations sensors 120, analyze the incoming data to identify prospective or current/active stability issues, and generate output 124 to alert the operator, control the machine, communicate results to a network, and/or perform other tasks. The stability analyzer 122 may include a computing device adapted to receive input data, process and/or store the input data, and generate the mentioned signals. For example, the stability analyzer 122 may include a processor 134 in data communication with one or more inputs 136 (e.g., to receive environmental and machine operation data) and in communication with one or more outputs 138 (e.g., to deliver commands based on the analysis). The stability analyzer 122 may also include a computer readable storage medium 140 configured for storing input data and for storing computer readable instructions for execution by the processor 134 for performing a stability analysis. The computer readable storage medium 140 may also store machine specific data relating to the geometry of the machine, moving parts of the machine such as implements of the machine, and other machine data relevant to calculating, for example, a center of gravity of the machine or other calculations relevant to machine stability. In one or more examples, the stability analyzer 122 may be part of the ECM 114 as shown in FIG. 2, or the stability analyzer 122 may be separate from the ECM 114. Like the ECM 114, the stability analyzer 122 may include, or access, memory, secondary storage devices, processors, and any other components for running an application. The memory and secondary storage devices may be in the form of read-only memory (ROM) or random-access memory (RAM) or integrated circuitry that is accessible by the controller. Various other circuits may be associated with the stability analyzer such as power supply circuitry, signal conditioning circuitry, driver circuitry, and other types of circuitry.

As mentioned, the stability analyzer 122 may be adapted to identify prospective or current/active stability issues and take one or more actions based on the analysis. The stability analyzer 122 may identify prospective stability issues, for example, based on sloping grade data from the surface sensor 126 and/or soil data from the soil condition sensor 128. That is, based on this information, particular areas of a work site may be identified as overly steep, unstable, a combination of both, or otherwise non-navigable. In other situations, based on sloping grade data or soil data, particular areas may be identified as potentially problematic if navigated in a particular way, but more suitable if navigated in a different way. For example, steeper grades may be navigable if the work machine 100 travels up or down the slopes rather than across the slopes or avoids particular steering maneuvers. As another example, loose soils may be more suitably navigated if loads to the soil are relatively balanced or, for example, centered on the work machine. Combinations of steeper grades and loose soils may be navigable initially by travelling up/down the slopes, but once compacted, may be navigable by travelling across the slopes, so, for example, the stability of areas may change as compaction is performed or other operations are performed. Still further, particular slopes and soil conditions may be navigable by some machines and not others. In view of this, the stability analyzer 122 may rely on the environmental information to create a map of the work site identifying a range of zones with varying levels or types of machine stability issues. The stability analyzer may establish geofences around these areas where the geofences are designed to trigger machine control limitations as a work machine 100 enters a zone or lift the limitations as a machine exits the zone, for example. In some cases, identification of a zone may include establishing a buffer around the zone. Moreover, specific controls discussed below may be implemented by the stability analyzer 122 based on these zones.

While the surface sensor 126 and the soil condition sensor 128 may be effective to identify problem areas ahead of time, the work machine 100 may still encounter situations where stability is a current or active concern underfoot. In those situations, the work machine 100 may identify a stability issue and take remedial measures to remedy the situation.

With respect to identifying an active stability issue, several examples may be provided. In some cases, stability issues may be identifiable from a single sensor. For example, the stability analyzer 122 may, for example, receive input from the orientation sensor 130 that is sufficient to identify risk of roll over or sliding. In some cases, this input may be compared to a threshold value or range of threshold values. In one or more examples, the thresholds for roll may be lower than the thresholds for pitch. Moreover, combinations of roll and pitch may be used to establish intermediate thresholds. Still further, a progressively increasing roll or pitch angle may suggest rolling or tipping is occurring and/or imminent.

Stability issues may also be identifiable based on input from multiple sensors. For example, the orientation input may be compared to a known surface slope where, for example, the surface slope is known from the surface sensor 126. Where the orientation input does not match the surface slope or varies from the surface slope by a sufficient amount, this may be an indication of rolling, pitching, or both, relative to the surface 50. In other examples, steering direction and/or degree of steering may be determined from feedback sensors or devices 132 in the steering system 108 and yaw of the work machine may be obtained from the orientation sensor 130. Where changes in yaw do not reflect the steering amounts or directions of steering from steering feedback sensors 132, the stability analyzer 122 may identify the work machine 100 as sliding, for example. In other examples, pitch or roll angles from the orientation sensor 130 may be used in combination with steering feedback to identify stability issues. For example, particular steering directions and/or degrees of turn in combination with roll and/or pitch angles may give rise to a stability concern. That is, the single sensor approach described above may be augmented for a more refined approach to identifying stability where the roll and/or pitch thresholds, for example, may be raised or lowered depending on the direction and degree of turn of a work machine 100. In some cases, thresholds may not be used and, instead, a mathematical analysis such as a summation of forces and moments on the machine may be used. That is, for example, for any given machine condition based on a known machine geometry and the feedback from the several feedback sensors 132, a machine center of gravity may be determined. Moreover, based on steering feedback and orientation data, the support condition of the work machine 100 relative to the center of gravity of the work machine 100 may be determined. With the assumption that gravitational forces may act through the center of gravity and that support forces may act normal to the surface 50 and frictionally along the surface 50, the stability of the machine 100 may be analyzed to determine if propagation of rolling or pitching is at risk of occurring. For example, if a component of the gravitational force oriented along the surface is equal to or greater than the frictional force, the machine may be said to be at risk of sliding. Moreover, if the moment based on the normal support force is equal to or less than an opposite acting moment due to forces through the center of gravity, the machine may be said to be at risk of rolling or pitching. In some cases, if the vibration system is active, effects of vibration (e.g., lowered coefficients of friction and/or looser soil) may be included in the analysis. That is, for example, based on soil data from the soil condition sensor, effects of vibration may be increased or decreased. Where the soil is loose with a lot of voids, soil stability may be low and the support force may be reduced as well as any coefficients of friction. Still other combinations of data from the environmental and machine operating condition sensors may be used to identify a stability issue.

Based on the identification of stability issues either prospectively or currently/actively, the stability analyzer 122 may generate one or more outputs 124. That is, as discussed with respect to FIG. 3, the stability analyzer 122 may issue an alert/alarm 142, take action to control the machine 144, and/or communicate a stability result and/or control to an off-machine location 146. With respect to an alarm or alert 142, this may include onboard or remote alarms or alerts that are designed to get the attention of an onboard operator, a remote operator, or a fleet manager, for example. The alarms or alerts 142 may include visual alarms or alerts such as a solid or flashing light. The alarms or alerts may also include sound alarms including beeping noises or other sounds. The alarms or alerts 142 may include varying degrees of urgency depending on the severity of the stability issue for which the operator or manager is being alerted. In the case of visual alarms, the light color may range from, for example, yellow, to orange, to red, to blood red or the flashing of a lighted alarm may range from slow, to medium, to fast. Still other types of alerts or alarms may be provided.

With respect to machine controls 144, the machine 100 may be controlled to avoid and/or accommodate prospectively identified stability issues. That is, as mentioned above, portions of a work site may be mapped or zoned based on captured environmental information around the machine and geofences may help to define these zones. Accordingly, the stability analyzer 122 may issue control signals to one or more aspects of the machine 100 based on approaching zones or based on entering the zones. For example, and in some cases, where a particular area of a work site is identified as unstable or otherwise non-navigable, the stability analyzer 122 may react to the respective geofence by steering a work machine 100 around the area or simply interrupting travel until a new course of travel is taken. In other situations, based on the type of zone (e.g., too steep to travel across), the stability analyzer 122 may react to a geofence around the zone by steering the work machine 100 up and down a slopes rather than across the slope. In other situations, the stability analyzer 122 may react to a geofence around a particular zone by controlling the machine to avoid particular turning directions and/or avoiding particular amounts of turning. Still further, particular zones may be dealt with by avoiding use of the vibration systems 110, changing an implement position or the loading of an implement, changing or controlling the speed of the machine 100, or controlling other operating factors of the machine 100. Still other machine controls may be directed by the stability analyzer 122 to deal with and/or accommodate preemptively identified zones on a work site.

Where stability areas are not successfully identified ahead of time, a machine may encounter situations where stability is current or active underfoot. In these situations, the stability analyzer 122 may issue machine controls 144 to counteract or control the stability issue. For example, if orientation of the machine reflects rolling, the stability analyzer may steer the machine 100 in the direction that the machine is rolling or may take other remedial action with the steering system 108. In another example, if a combination of steering direction or degree with orientation gives rise to the stability concern, the stability analyzer 122 may steer the machine 100 in a different direction or limit the degree of steering to manage the stability issue. In other situations, for example if a machine is identified as sliding on a side slope, the machine may turn off the vibration system to remove or reduce the effects of soil stability on machine stability and/or to increase friction coefficients. In addition, the stability analyzer 122 may steer in the direction of sliding or in another direction or limit steering in a particular direction to help reduce risks associated with sliding. In still other situations the stability analyzer 122 may adjust the position of an implement to control the position of the center of gravity of the work machine 100 and increase machine stability. In other situations, the speed of the machine may be reduced. Still other adjustments may be made and adjustments may be prioritized based on the aspect of the analysis that is having the greatest effect on machine stability. That is, the stability analyzer may compare the effect of several factors on stability and eliminate the factor having the greatest adverse effect.

Another output 124 may include a communication of the result and/or an instruction of the stability analysis 146. There may be several circumstances where the stability result may be communicated to a location off of the machine. For example, where the analyzer is located on the machine, but autonomous or remote control is at a separate location, the result may be communicated to a control station, for example, and may be done so in combination with an alert or alarm. Additionally or alternatively, the communication of the result off of the machine may be performed for purposes of managing a fleet or series of machines in addition to the present machine. In one or more examples, communicating a stability result off of a machine may be used to establish a geofence or portion of a geofence, where a particular portion of a work site is identified as unstable or otherwise non-navigable for one or more work machines. Still other bases for communicating the result and/or an instruction of the stability analysis to another location off of the machine.

INDUSTRIAL APPLICABILITY

Figure 4:
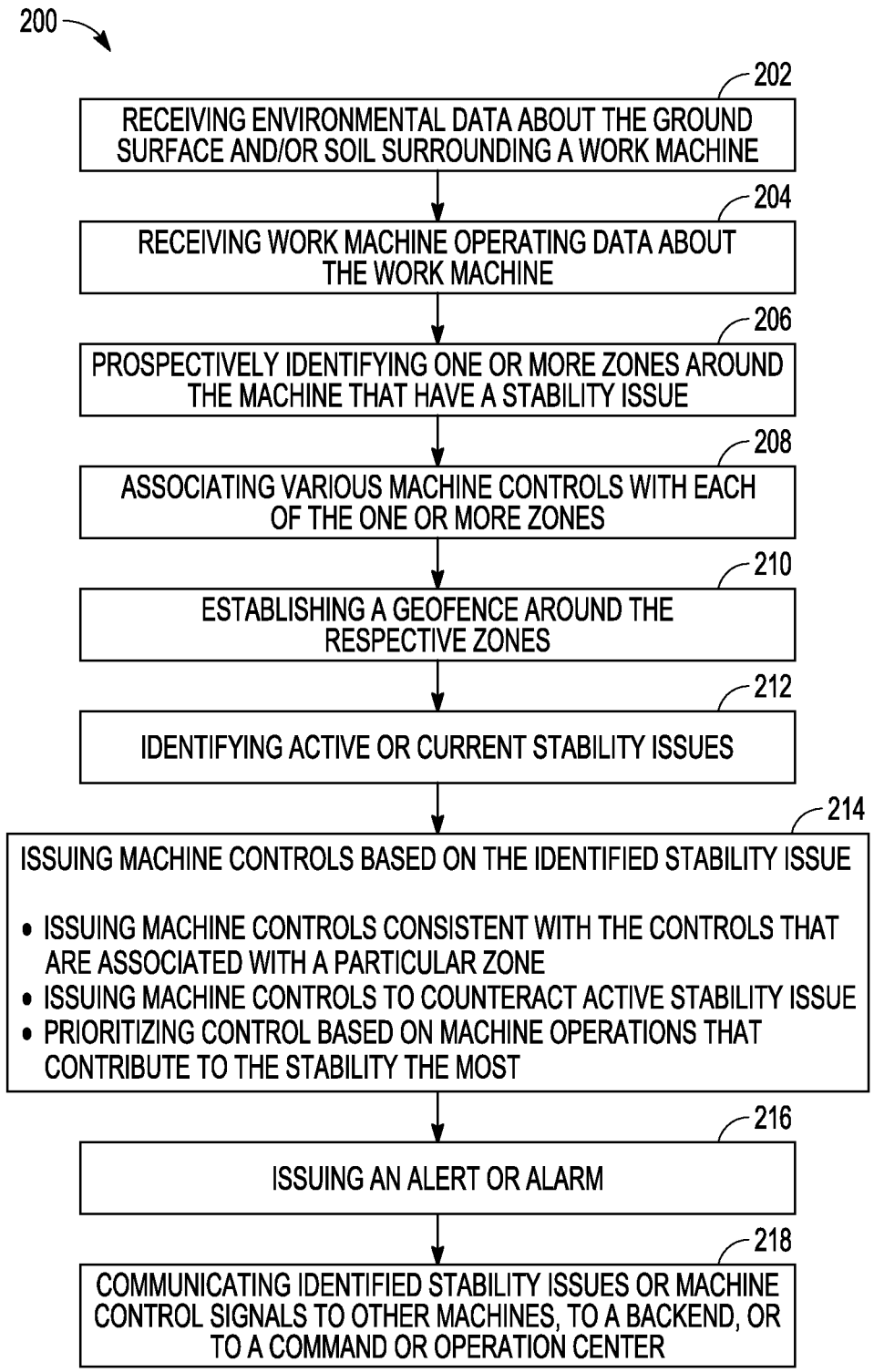
FIG. 4 is a diagram depicting a method of performing stability control of a work machine, according to one or more examples.

In operation and use, a method 200 of monitoring machine stability may be provided. As shown in FIG. 4, the method may include receiving environmental data about the ground surface and/or soil surrounding a work machine 202. The method may also include receiving work machine operating data about the work machine 204. The method may also include prospectively identifying one or more zones around the machine that have a stability issue 206. That is, the method may include analyzing the environmental data to identify zones that may cause stability issues for the work machine. Once identified, the method may also include associating various machine controls with each of the one or more zones 208. The machine controls may be tailored for maintaining machine stability with respect to the zone base on knowledge of the ground surface and/or soil conditions in the zone. For example, up/down travel may be associated with a zone. No travel may be associated with a zone. Balanced machine weight may be associated with a zone. Vibration system limitations may be associated with a zone. Still other machine controls and combinations of machine controls may be associated with a zone based on the environmental data. In one or more examples, the method may include establishing a geofence around the respective zones 210. The method may also include identifying active or current stability issues 212. For example, orientation data from an orientation sensor may be compared to thresholds or it may be combined with other data from other machine feedback sensors and then compared to thresholds. Alternatively or additionally, the stability of the machine may be analyzed based on orientation data, soil information, machine feedback data, and/or machine geometry to determine whether a work machine is at risk of rolling or pitching or is actively rolling or pitching. Based on prospectively identified stability zones or current/active stability issues, the method may also include issuing machine controls based on the identified stability issue 214. Where zones are encountered, the stability analyzer may issue machine controls consistent with the controls that are associated with a particular zone. That is, where a zone is encountered that has an up/down travel control associated with it, the stability analyzer may control steering of the machine to travel through the zone in an up/down fashion. Where active or current stability is an issue, the stability analyzer may issue machine controls to counteract the stability issue. For example, the stability analyzer may issue a control to steer the work machine in a direction of rolling or limit the functionality of particular systems. In one or more examples, the method of remedying a current/active stability issue may include prioritizing control based on machine operations that contribute to the stability the most. In one or more examples, the method may also include issue an alert or alarm 216. Still further, the method may include communicating identified stability issues or machine control signals to other machines, to a backend, or to a command or operation center 218. Still other steps may be performed to maintain the stability of the work machine based on the system described in detail above.

The above detailed description is intended to be illustrative, and not restrictive. The scope of the disclosure should, therefore, be determined with references to the appended claims, along with the full scope of equivalents to which such claims are entitled.

What is claimed is:

1. A work machine stability monitoring system, comprising:
    an environmental sensor configured to capture environmental information about a condition of ground around a work machine;
    a machine operating sensor configured to capture operation information of the work machine; and
    a stability analyzer configured for:
        receiving the environmental information and the operation information;
        prospectively identifying zones with stability issues based on the environmental information;
        identifying active stability conditions of the work machine based on the operation information; and
        issuing machine controls to correct the active stability conditions of the work machine, wherein issuing machine controls comprises deactivating a vibration system of the machine.

2. The work machine of claim 1, wherein the machine operating sensor comprises an orientation sensor configured to capture a roll angle of the work machine.

3. The work machine of claim 2, wherein the machine operating sensor comprises a steering sensor configured to capture steering direction or an offset sensor to capture an amount of offset between a front portion and a rear portion of the work machine.

4. The work machine of claim 3, wherein the steering sensor is further configured to capture degree of steering.

5. The work machine of claim 2, wherein identifying active stability issues is based on both the roll angle and the steering direction.

6. The work machine of claim 5, wherein identifying active stability issues includes comparing the roll angle to a threshold, where the threshold is based on steering direction.

7. The work machine of claim 5, wherein identifying active stability issues includes summing forces or moments acting on the machine.

8. The work machine of claim 1, wherein issuing machine controls comprises controlling a steering direction of the machine.

9. The work machine of claim 1, wherein prospectively identifying zones with stability issues comprises associating machine controls with the zones.

10. The work machine of claim 9, wherein the machine controls comprise an up/down path through the zone.

11. The work machine of claim 10, wherein the machine controls no entry into the zone.

12. The work machine of claim 9, wherein prospectively identifying zones with stability issues further comprises establishing a geofence around the zone.

13. The work machine of claim 12, wherein the stability analyzer is further configured to issue the machine controls associated with a zone when a geofence is encountered by the work machine.

14. A method of monitoring the stability of a work machine, comprising:
   receiving environmental data about a condition of ground surrounding a work machine;
   receiving work machine operating data about the work machine;
   prospectively identifying a zone around the machine that has a stability issue;
   identifying active stability conditions; and
   issuing machine controls to correct the active stability conditions of the work machine, wherein issuing machine controls comprises deactivating a vibration system of the machine.

15. The method of claim 14, wherein the work machine operating data comprises orientation data and identifying active stability conditions is based on the orientation data.

16. The method of claim 15, wherein the work machine operating data comprises steering data including a direction of steering.

17. The method of claim 16, wherein identifying active stability conditions is performed using at least one of:
   a comparison to a threshold; and
   a force/moment analysis of machine stability.

18. The method of claim 14, wherein prospectively identifying a zone comprises establishing a geofence around the zone and associating machine controls with the zone.

* * * * *